US012481884B2

(12) United States Patent
Brandt et al.

(10) Patent No.: US 12,481,884 B2
(45) Date of Patent: Nov. 25, 2025

(54) REINFORCEMENT LEARNING-BASED TECHNIQUES FOR TRAINING A NATURAL MEDIA AGENT

(71) Applicant: Adobe Inc., San Jose, CA (US)

(72) Inventors: Jonathan Brandt, Santa Cruz, CA (US); Chen Fang, Sunnyvale, CA (US); Byungmoon Kim, Sunnyvale, CA (US); Biao Jia, College Park, MD (US)

(73) Assignee: Adobe Inc., San Jose, CA (US)

( * ) Notice: Subject to any disclaimer, the term of this patent is extended or adjusted under 35 U.S.C. 154(b) by 59 days.

(21) Appl. No.: 18/479,486

(22) Filed: Oct. 2, 2023

(65) Prior Publication Data

US 2024/0037398 A1    Feb. 1, 2024

Related U.S. Application Data

(62) Division of application No. 16/549,072, filed on Aug. 23, 2019, now Pat. No. 11,775,817.

(51) Int. Cl.
*G06N 3/08* (2023.01)
*G06N 3/04* (2023.01)
*G09G 5/37* (2006.01)

(52) U.S. Cl.
CPC ............. *G06N 3/08* (2013.01); *G06N 3/04* (2013.01); *G09G 5/37* (2013.01)

(58) Field of Classification Search
CPC .................................. G06N 3/08; G06N 3/04
See application file for complete search history.

(56) References Cited

PUBLICATIONS

Huang et al. "Learning to Paint With Model-based Deep Reinforcement Learning." Mar. 22, 2019. arXiv. 1903.04411v2. https://arxiv.org/abs/1903.04411v2. pp. 1-11. (Year: 2019).*
Xie et al. "Artist Agent: A Reinforcement Learning Approach to Automatic Stroke Generation in Oriental Ink Painting." 2013. IEICE Transactions on Information and Systems.http://dx.doi.org/10.1587/transinf.E96.D.1134. pp. 1134-1144. (Year: 2013).*
Ganin, Y., et al., "Synthesizing Programs for Images using Reinforced Adversarial Learning", arXiv preprint arXiv:1804.01118., pp. 1-12 (Apr. 3, 2018).
Huang et al., "Learning to Paint with Model-based Deep Reinforcement Learning" Co RR abs/1903.04411. 2019, pp. 1-11 (Aug. 16, 2019).

(Continued)

*Primary Examiner* — Antonio A Caschera
(74) *Attorney, Agent, or Firm* — Shook, Hardy & Bacon L.L.P.

(57) ABSTRACT

Some embodiments involve a reinforcement learning based framework for training a natural media agent to learn a rendering policy without human supervision or labeled datasets. The reinforcement learning based framework feeds the natural media agent a training dataset to implicitly learn the rendering policy by exploring a canvas and minimizing a loss function. Once trained, the natural media agent can be applied to any reference image to generate a series (or sequence) of continuous-valued primitive graphic actions, e.g., sequence of painting strokes, that when rendered by a synthetic rendering environment on a canvas, reproduce an identical or transformed version of the reference image subject to limitations of an action space and the learned rendering policy.

20 Claims, 13 Drawing Sheets

(56) References Cited

PUBLICATIONS

Zhou, T., et al., "Learning to Doodle with Deep Q-Networks and Demonstrated Strokes", The British Machine Vision Conference, pp. 1-13, (2018).
Winkenbach, G., and Salesin, D., H., "Rendering Parametric Surfaces in Pen and Ink", In Proceedings of the 23rd annual conference on Computer graphics and interactive techniques, pp. 469-476 (Aug. 1996).
Johnson, J., et al. "Perceptual Losses for Real-Time Style Transfer and Super-Resolution", European conference on computer vision, pp. 694-711 (2016).
Hertzmann, A., "Painterly Rendering with Curved Brush Strokes of Multiple Sizes", In Proceedings of the 25th annual conference on Computer graphics and interactive techniques pp. 1-8 (Jul. 1998).
Schulman, J., "Proximal Policy Optimization Algorithms", arXiv preprint arXiv: 1707.06347, pp. 1-12 (Aug. 28, 2017).

\* cited by examiner

REINFORCEMENT LEARNING-BASED TECHNIQUES FOR TRAINING A NATURAL MEDIA AGENT

CROSS-REFERENCE TO RELATED APPLICATION

This application is a Divisional of copending application Ser. No. 16/549,072, filed Aug. 23, 2019. The entire contents of which is hereby incorporated by reference into the present application.

TECHNICAL FIELD

Aspects of the disclosure are related to the field of machine learning and artificial intelligence, and in particular, to reinforcement learning-based techniques for training a natural media agent to implicitly learn a policy for rendering stylized non-photorealistic artistic works, e.g., paintings, drawings, etc., without human supervision or labeled datasets.

BACKGROUND

Throughout history artistic expression has been essential to human culture. Painting, for example, is one of the most important forms of human artistic expression. Indeed, like most forms of artistic expression, painting has evolved to become a massively diverse and complex artistic domain, comprising thousands of different styles, including subtle watercolor scenes, intricate Chinese ink landscapes, and detailed oil portraits of the Dutch masters.

SUMMARY

One or more embodiments described herein, among other benefits, solve one or more of the foregoing or other problems in the art by providing systems, methods, and non-transitory computer readable media that implicitly learn a rendering policy in a multi-dimensional continuous action space from a set of training references without human supervision or labeled datasets.

In some implementations, the technology described includes one or more computer readable storage media for training a natural media agent to implicitly learn a rendering policy in a multi-dimensional continuous action space from a set of training references. The one or more computer readable storage media include instructions that, when executed by at least one processor of a reinforcement learning-based system, iteratively cause the system to train the natural media agent. More specifically, when executed, the instructions cause the system to direct a media rendering engine to perform at least one primitive graphic action on a canvas in a synthetic rendering environment. The natural media agent applies the rendering policy to select the at least one primitive graphic action at each iteration based a working observation of a current state of the system. The instructions further cause the system to observe a visual state of the canvas and a position of a media rendering instrument within the synthetic rendering environment occurring as a result of performing the at least one primitive graphic action on the canvas. The instructions further cause the system to apply a loss function to compute a reward based on a goal configuration and the visual state of the canvas occurring as a result of performing the at least one primitive graphic action and provide the reward to the natural media agent to learn the rendering policy by refining the policy function.

In some implementations, the technology described includes a natural media agent. The natural media agent includes a deep neural network configured to approximate a rendering policy in a multi-dimensional continuous action space and program instructions. The program instructions, when executed by one or more processing systems of a computing apparatus, iteratively direct the computing apparatus to predict at least one primitive graphic action to be performed on a canvas in a synthetic rendering environment by feeding a current working observation to the deep neural network and provide the at least one primitive graphic action to a media rendering engine to perform the at least one primitive graphic action on the canvas. The program instructions, when executed by the one or more processing systems of the computing apparatus, further direct the computing apparatus to accumulate a reward associated with the primitive graphic action, detect a trigger to update the rendering policy, and responsively refine the deep neural network using the accumulated rewards to iteratively learn the rendering policy. In some implementations, the reward is defined as a difference between an updated state of the canvas occurring as a result of performing the at least one primitive graphic action and a current training reference image of a set of training references. Alternatively or additionally, the reward can be defined as a change in the difference between the canvas state after the action and the reference and the canvas state before the action and the reference: Difference (canvas before action, reference)−Difference (canvas after, reference).

In some implementations, the technology described includes a method for iteratively training a policy network to implicitly learn a rendering policy from a set of training references. The method includes observing a current visual state of a canvas and a current position of a media rendering instrument within a rendering environment, predicting at least one primitive graphic action to be performed on the canvas by feeding the current position of the media rendering instrument, at least a portion of the current visual state of the canvas, and at least a portion of a current training reference of the set of training references to the policy network, and observing an updated visual state of the canvas and an updated position of the media rendering instrument within the rendering environment occurring as a result of performing the at least one graphic action on the canvas. The method further includes comparing the updated visual state of the canvas with a goal configuration to determine a reward and refining the network policy based on the reward to iteratively learn the rendering policy.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1A:
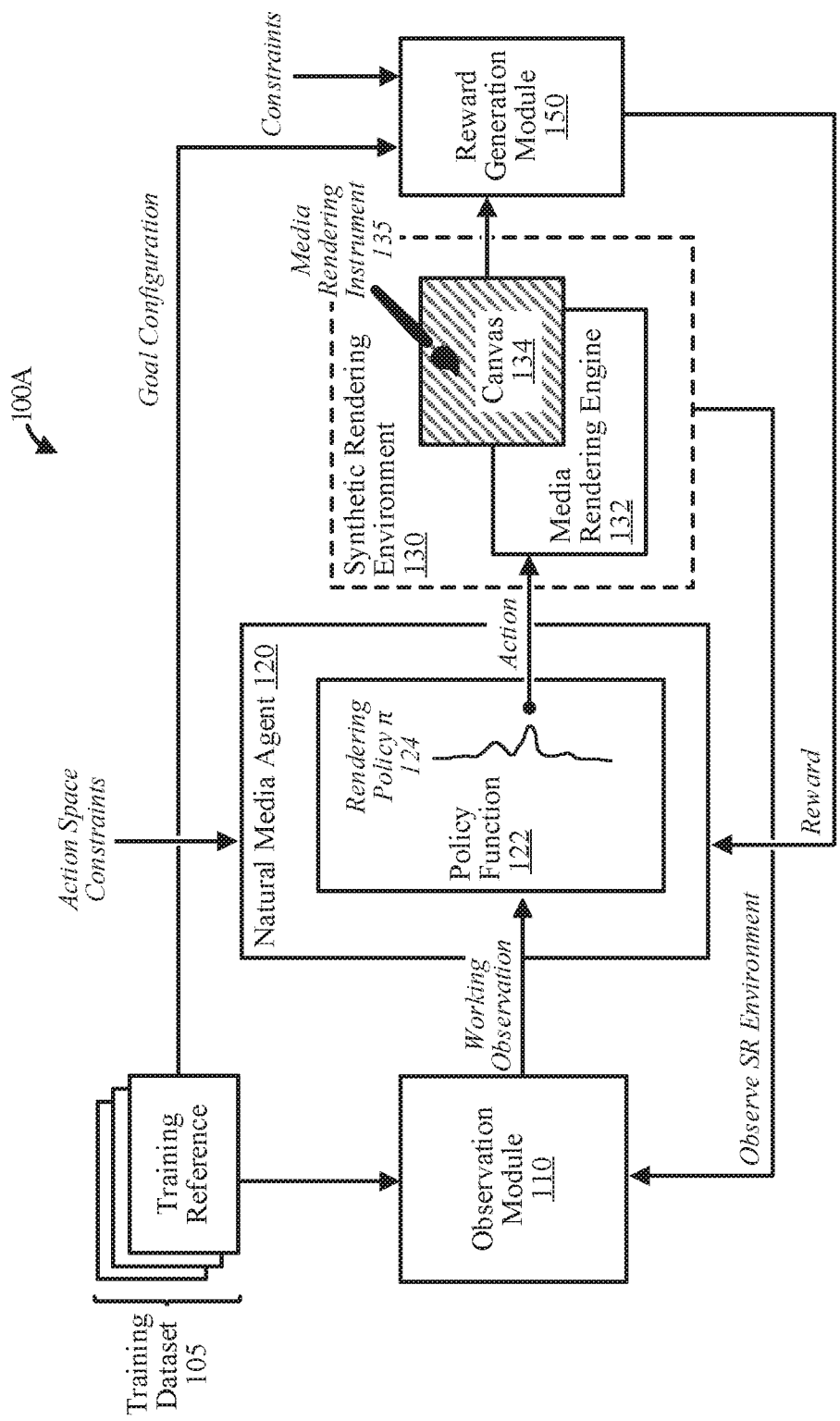
FIG. 1A depicts a block diagram illustrating an example reinforcement learning-based system (RL-system) for training a natural media agent to implicitly learn a rendering policy π in a multi-dimensional continuous action space based on a training dataset, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

Over the last few decades there has been considerable effort to simulate human artistic expression through non-photorealistic rendering techniques. For example, in the painting domain, stroke-based rendering and painterly rendering techniques have been generated using manually engineered algorithms or heuristics-based methods. While these efforts have produced compelling results, the results are limited by their dependency on hand-engineering to produce each new style. Indeed, a custom algorithm must be programmed, or heuristics manually developed, to produce each new stylized media technique, e.g., stipple drawings, pen-and-ink sketches, oil painting, etc., and style associated therewith.

In recent years, deep neural networks including Generative Adversarial Networks and Variational Autoencoders have been explored as means to directly synthesize images with particular artistic styles. Generative Adversarial Networks, for example, are a particular structure of deep learning which enables synthesis of an image based on a particular style of a reference image using content of a second reference image. Indeed, a Generative Adversarial Network based image synthesis system can take a style from one image and content of another image to produce a third image.

These direct synthesis techniques demonstrate promise in synthesizing complex images in a controllable manner. However, the techniques are based on modeling a latent distribution of images along with a direct synthesis function to generate the raster image (at a fixed resolution), e.g., an image-to-image translation network for style transfer. Unfortunately, these image synthesis techniques produce rasterized images that are not easily manipulatable once produced, e.g., the rasterized digital image cannot be edited other than the digital image as a whole. Furthermore, these techniques entirely bypass the creation process of the artistic work.

The technology described herein is directed to a reinforcement learning based framework for training a natural media agent to learn a rendering policy without human supervision or labeled datasets. Indeed, the reinforcement learning based framework feeds the natural media agent a training dataset to implicitly learn the rendering policy based on the training dataset by exploring a canvas and minimizing a loss function. Once trained, the natural media agent can be applied to any reference image to generate a series (or sequence) of primitive graphic actions, e.g., sequence of painting strokes, that when rendered by a synthetic rendering environment on a canvas, reproduce an identical or transformed version of the reference image subject to limitations of an action space and the learned rendering policy.

Various technical effects can be enabled by the techniques discussed herein. Among other benefits, the natural media agent does not directly synthesize images or require hand-engineering or pre-defined heuristics to produce new styles. Rather, the reinforcement learning based framework utilizes a fully data-driven approach to train a natural media agent to learn a rendering policy.

As used herein, the term "natural media agent" refers to a reinforcement learning based agent that interacts with an environment via actions at discrete time steps, receives a reward based on the actions, and subsequently transitions to a new state. The natural media agent formally works through a theoretical framework known as a Markov Decision Process (MDP) which consists of a decision, e.g., what primitive graphic action to take or perform on a canvas, to be made at each state. The sequence of states, e.g., actions and corresponding rewards, are referred to as a trajectory. As discussed herein, reinforcement learning-based techniques are utilized for training the natural media agent to implicitly learn a rendering policy that simulates human artistic expression. Indeed, the natural media agent can render stylized non-photorealistic artistic works, e.g., paintings, drawings, etc., without human supervision or labeled datasets using the learned rendering policy. For example, once trained, the natural media agent can be applied to any reference image to generate a series (or sequence) of primitive graphic actions, e.g., sequence of painting strokes, that when rendered by a synthetic rendering environment on a canvas, reproduce an identical or transformed version of the reference image based on the learned rendering policy.

As used herein, the term "primitive graphic action" refers to an action performed by the natural media agent on a canvas via a media rendering instrument. Each primitive graphic action can be defined as a multi-dimensional vector including, among other possibilities, encoded values representing pressure, length, width, tilt (or angle), color, etc. In the painting domain, for example, a primitive graphic action can be a digital representation of a paint stroke defined as a continuous vector of stroke configurations composed of angle, length, width, color, etc. The primitive graphic actions can additionally represent movement of the media rendering instrument, e.g., movement of a painting brush (on or off the canvas) within a synthetic rendering environment, changes to the media rendering instrument (e.g., type or size of a painting brush), etc.

As used herein, the term "action space" refers to a set of the various possible primitive graphic actions that can be taken by the natural media agent. As discussed above, each graphic action can be defined as a multi-dimensional vector. Additionally, the action space can be continuous, i.e., not discrete.

As used herein, the term "policy function" refers to a probability distribution of primitive graphic actions given a particular state. The policy function approximates a rendering policy. The policy function can be implemented by a machine learning model. For example, the policy function can be implemented using a support vector machine or neural network-based framework. The outputs of the policy function can be referred to as the action space. As used herein, the term "rendering policy" refers to the policy for selecting primitive graphic actions given a particular state. The rendering policy is not known and thus, as noted above, the policy function is designed to approximate the rendering policy.

As used herein, the term "episode" refers to a trial or attempt to achieve a particular goal configuration during a preset number of time steps. For example, for each trial (or episode) an image can be selected from a set of reference images. The selected image can be set as the goal configuration. Each episode is then characterized by failure or success of the natural media agent to achieve the corresponding goal configuration after the preset number of time steps.

As used herein, the term "reward" refers to a scalar signal received as a result of observing a current visual state of a canvas occurring as a result of performing one or more selected primitive graphic actions. The reward can be defined as a change in the difference between the canvas state after the action and the reference and the canvas state before the action and the reference: Difference (canvas before action, reference)−Difference (canvas after, reference). Alternatively, the reward can be the evaluation of current primitive graphic action computed as the similarity between a target system state and a current system state. The natural media agent uses the received rewards to implicitly learn (iteratively change) the rendering policy by refining the policy function representative of the rendering policy.

As used herein, the term "egocentric patch" refers to an area (or portion) of a current visual state of a canvas or a current training reference that is less than the total area. The egocentric patch can be selected based on the current position of the media rendering instrument within a synthetic rendering environment. For example, egocentric patches (or portions) of the current visual state of the canvas and/or the current training reference can be centered about the current position of the media rendering instrument. The egocentric patches can be fed to the natural media agent to direct the natural media agent to attend to a particular region of the canvas in the area of the current position of a media rendering instrument.

As used herein, the term "neural network" (or artificial neural network) refers to a machine-learning model that can be tuned (e.g., trained) to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms. In other words, a neural network is an algorithm that implements learning techniques, i.e., machine learning that utilizes a set of algorithms to attempt to model high-level abstractions in data.

Similarly, the term "deep neural network" refers to an artificial neural network with multiple layers between the input and output layers. A deep neural network finds the correct mathematical manipulation to turn the input into the output, whether it be a linear relationship or a non-linear relationship. The network moves through the layers calculating the probability of each output. Each mathematical manipulation as such is considered a layer, and complex deep neural networks can have many layers.

A general overview and architecture of the reinforcement learning-based framework for training a natural media agent is described in relation to FIG. 1A. An example framework for applying the trained natural media agent is then described in relation to FIG. 1B. Thereafter, a more detailed description of the components and processes of the reinforcement learning-based framework are provided in relation to the subsequent figures.

FIG. 1A depicts a block diagram illustrating an example reinforcement learning-based system (RL-system) 100A for training a natural media agent 120 to implicitly learn a rendering policy π 124 in a multi-dimensional continuous action space based on a training dataset 105, according to some implementations. Indeed, the RL-system 100A can train the natural media agent 120 to iteratively learn the rendering policy π 124 in a multi-dimensional continuous action space for various domains of artistic expression, e.g., paintings, drawings, etc., as well as different types, styles, etc., corresponding to those domains, without human supervision or labeled datasets.

Once trained, the natural media agent 120 can be applied to any reference image for step-by-step (or stepwise) selection of a series (or sequence) of primitive graphic actions, e.g., sequence of painting strokes in the painting domain, that, when rendered on a canvas 134 in a synthetic rendering environment 130, produce a stylized non-photorealistic version (or reproduction) of the reference image subject to limitations of the action space and the (learned) rendering policy $\pi$ 124. Indeed, the natural media agent 120 is trained to select a series (or sequence) of primitive graphic actions that, when rendered on the canvas 134 by the synthetic rendering environment 130, reproduce the reference image action-by-action in the implicit style learned based on the training dataset 105.

As shown in the example of FIG. 1A, the RL-system 100A includes a training dataset 105, an observation module 110, the natural media agent 120, the synthetic rendering environment 130, and a reward generation module 150. The training dataset 105 is comprised of multiple training references, e.g., training reference images. The synthetic rendering environment 130 includes a media rendering engine 132 and the canvas 134. Additional or fewer systems or components are possible.

The natural media agent 120 includes a policy function 122 that is designed to approximate the rendering policy $\pi$ 124. The policy function 122 can be implemented by a machine learning model. For example, the policy function 122 can be implemented using a support vector machine or implemented using a neural network-based framework. Indeed, in some implementations, the policy function 122 is implemented by using a deep neural network. The outputs of the policy function 122 can be referred to as the action space. The natural media agent 120 can operate in a multi-dimensional continuous action space meaning that a vast number of unique outputs (or actions) are possible. As discussed herein, the RL-system 100A trains the policy function 122 to implicitly learn the rendering policy $\pi$ 124 in a multi-dimensional continuous action space for various domains of artistic expression, e.g., painting, drawing, etc., as well as corresponding types, styles, etc., without human supervision or labeled datasets. As discussed herein, the term "implicit learning" refers to learning a rendering policy without human supervision or labeled datasets.

The RL-system 100A is configured to train the natural media agent 120 to implicitly learn a rendering policy $\pi$ 124 from a set of training references 105. Indeed, during each episode, the RL-system 100A iteratively tries to reproduce a current training reference of the training dataset 105 action-by-action in a style represented by the current rendering policy $\pi$ 124. More specifically, at each iteration of an episode, the natural media agent 120 applies the current rendering policy $\pi$ 124 to predict one or more primitive graphic actions which can be performed on a canvas 134 of a synthetic rendering environment 130. The reward generation module 150 observes whether the one or more primitive graphic actions bring the canvas 134 into closer correspondence with the current reference image and, if so, provide a reward to the natural media agent 120.

The natural media agent uses the reward to implicitly learn the rendering policy $\pi$ 124 by refining a policy function 122 representative of the rendering policy $\pi$ 124. For example, the natural media agent 120 can reinforce aspects of the rendering policy $\pi$ 124 that bring the canvas 134 into closer correspondence with a training reference and negatively reinforce aspects of the rendering policy $\pi$ 124 that do not bring the canvas 134 into closer correspondence with a training reference.

The observation module 110 observes, at each iteration, a current state of the RL-system $S_i$ and generates a working observation (or "current observation") $O(S_i)$ of a current state of the RL-system $S_i$ that is fed to the natural media agent 120. The working observation of current state of the RL-system $O(S_i)$ is defined as the combination of a current state of the synthetic rendering environment 130 and the current training reference to which the natural media agent 120 is being applied. The current state of the synthetic rendering environment 130 includes a current visual state of the canvas 134 and a current position of the media rendering instrument 135 within the synthetic rendering environment 130.

In some implementations, the working observation $O(S_i)$ can be subset or a combination of states that are purposefully chosen or observable. For example, working observation $O(S_i)$ can be a brush-local subset of the current state of the RL-system 100A $S_i$. Indeed, the observation module 140 can capture egocentric patches (or portions) of the current visual state of the canvas 134 and the current training reference based on the current position of the media rendering instrument 135 within the synthetic rendering environment 130. In some implementations, the egocentric patches (or portions) of the current visual state of the canvas 134 and the current training reference can be centered about the current position of the media rendering instrument 135. The egocentric patches direct the natural media agent 120 to attend to a particular region of the canvas 134 in the area of the current position of the media rendering instrument 135. Attending to the regions of the canvas in the area of the current position of the media rendering instrument ensures a level of efficiency in the media rendering process.

The current visual state of the canvas 134 and the current training reference (or patches thereof) can be concatenated and encoded with current position of the media rendering instrument 135 within the synthetic rendering environment 130. The operation and functionality of the observation module 150 is shown and discussed in greater detail with reference to FIGS. 4A and 4B. As shown in the example of FIG. 1A, the observation module 140 feeds the working observation state $O(S_i)$ as input to the natural media agent 120.

The natural media agent 120 receives the working observation $O(S)$ as input and uses the policy function 122 to predict a next primitive graphic action as output. Indeed, for each iteration (or step) i, the input of the policy function 122 is $O(S_{i-1})$ and the output is the primitive graphic action $\alpha = \pi(O(S_{i-1}))$. As discussed herein, each primitive graphic action $a_i$ is defined as a multi-dimensional vector. The dimensions of the vector can include, among other possibilities, encoded values representing pressure, length, width, tilt (or angle), color, etc. In the painting domain, for example, a primitive graphic action $a_i$ can be a digital representation of a paint stroke defined as a continuous vector of stroke configurations composed of angle, length, width, color, etc.

In some implementations, a primitive graphic action $a_i$ can alternatively or additionally represent movement of the media rendering instrument 135, e.g., movement of a painting brush (on or off the canvas 134) within the synthetic rendering environment 130, changes to the media rendering instrument 135 (e.g., type or size of a painting brush), etc.

The primitive graphic action $a_i$ is fed to the synthetic rendering environment 130 and implemented (or performed) by the media rendering engine 132, e.g., mark rendered on the canvas 134, or movement or change of the media rendering instrument 135 within the synthetic rendering environment 130. In some implementations, the media rendering engine 132 can be a virtual system or environment that executes the primitive graphic action $a_i$ on a digital canvas. Alternatively, or additionally, the media rendering engine 132 can be a physical robot or other autonomous system configured to physically implement the primitive graphic actions $a_i$ using a real (or physical) media rendering instrument 135 on a real (or physical) canvas 134.

The reward generation module 150 generates a reward r based on an observation of the current visual state of the canvas 134. In some implementations, the reward is defined as a change in the difference between the canvas state after the action and the reference and the canvas state before the action and the reference: Difference (canvas before action, reference)–Difference (canvas after, reference). Alternatively, in some implementations, the reward $r_i$ is the evaluation of current primitive graphic action $a_i$ computed as the similarity between a target system state S* and the current RL-system state S. Indeed, at each step i, the reward generation module 150 generates a reward $r_i=V_\pi(O(S_i))$, wherein $V_\pi$ is the value function of the reward generation module 150 predicted based on the current observation or $O(S_i)$. More specifically, the reward generation module 150 computes a corresponding reward $r_i$ defined by as a difference between a visual state (or representation) of the canvas 134 and the reference image. The operation and functionality of the reward generation module 150 is shown and discussed in greater detail with reference to FIG. 5.

In some implementations, the reward generation module 150 applies a loss function to compute the reward of an action during each iteration of the RL-system. More specifically, the reward generation module 150 applies a loss function to compute a reward based on a goal configuration and the visual state of the canvas occurring as a result of performing the at least one primitive graphic action predicted by the natural media agent 120. As discussed herein, the goal configuration can be the current training reference of the training dataset 105. To better reproduce future training references (or input references once the natural media agent 120 is trained), the reward is designed to stimulate the natural media agent 120 to select actions that reduce a distance (or difference) between the current visual state of the canvas 134 and the current training reference as much as possible.

Although not discussed in detail, in some implementations, the reward can alternatively or additionally include a negative reward (or penalty) if a primitive graphic action $a_i$ acts to increase a distance between the current canvas and the reference image.

The RL-system 100A feeds the reward $r_i$ occurring as a result of implementing the primitive graphic actions to the natural media agent 120. As discussed herein, the natural media agent 120 uses the reward to implicitly learn the rendering policy π 124 by refining the policy function 122 representative of the rendering policy π 124. For example, the natural media agent 120 can reinforce aspects of the rendering policy π 124 that bring the canvas 134 into closer correspondence with a training reference and negatively reinforce aspects of the rendering policy π 124 that do not bring the canvas 134 into closer correspondence with a training reference. In some implementations, the natural media agent 120 accumulates rewards and learns the rendering policy π 124 by refining the policy function based on the accumulated rewards.

In some implementations, the RL-system 100A adopts a variant of proximal policy optimization reinforcement learning to train the natural media agent 120 by sampling one or more actions at each iteration. As discussed herein, sampling actions can refer to the process of selecting one or more actions and determining what reward is received based on the results of preforming those actions on the canvas. The learning process continues iteratively for each training reference until the target visual state of the canvas 134 resembles the goal configuration, e.g., current training reference or target photorealistic artistic work, or some other trigger or timeout occurs, e.g., maximum step limit for episode reached.

In some implementations, several techniques to reduce the search (or exploration) space of the policy function 122 can be utilized. As discussed herein, a reinforcement learning framework is described that has an associated action space, e.g., possible actions that can be performed on the canvas. The search (or exploration) space refers to the process of exploring which actions result in the highest rewards. Indeed, curriculum learning, and difficulty-based sampling can be utilized to improve convergence performance. For example, the RL-system 100A can set a limit on a number of steps for each episode, even if the natural media agent 120 fails to achieve the goal configuration. The RL-system 100A then increases the limit gradually and uses curriculum learning to encourage the natural media agent 120 to find the reward greedily in the limited time steps (or iterations). As discussed herein, each episode is characterized by failure or success of the RL-system 100A to achieve a corresponding goal configuration after a preset number of time steps.

In some implementations, difficulty-based sampling techniques can be utilized to overcome the bias between different samples—one of the main challenges to overcome. For common reinforcement learning tasks, the goal is usually fixed. In the case of the RL-system 100A, however, the training references can be different to prevent an over-fitting problem. Specifically, the RL-system 100A can incorporate a difficulty-based sampling approach to sample more (allow more iterations) from the images that are predicted to have the worst performance.

Figure 12:
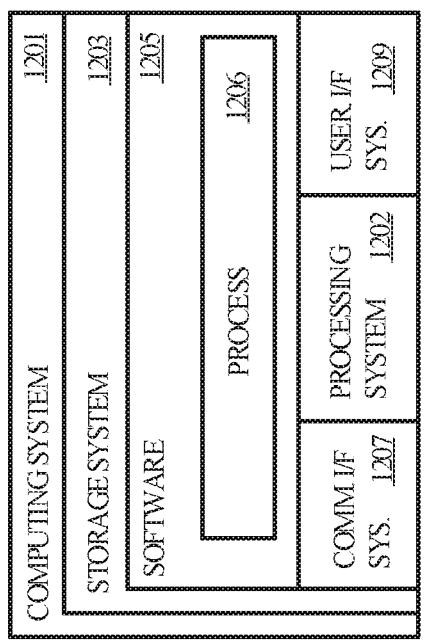
FIG. 12 depicts a block diagram illustrating an example computing system suitable for implementing the technology disclosed herein, including any of the applications, architectures, elements, processes, and operational scenarios and sequences illustrated in the Figures and discussed below in the Technical Disclosure.

One or more components of the RL-system 100 can include or be executed on any system or collection of systems configured to perform the actions discussed herein. The system or collection of systems may include server computers, blade servers, rack servers, and any other type of computing system (or collection thereof) suitable for training the natural media agent 120 and/or otherwise carrying out the operations discussed herein. Such systems may employ one or more virtual machines, containers, or any other type of virtual computing resource in the context of improving application performance orchestration on a platform of which computing system 1201 of FIG. 12 is representative.

Figure 1B:
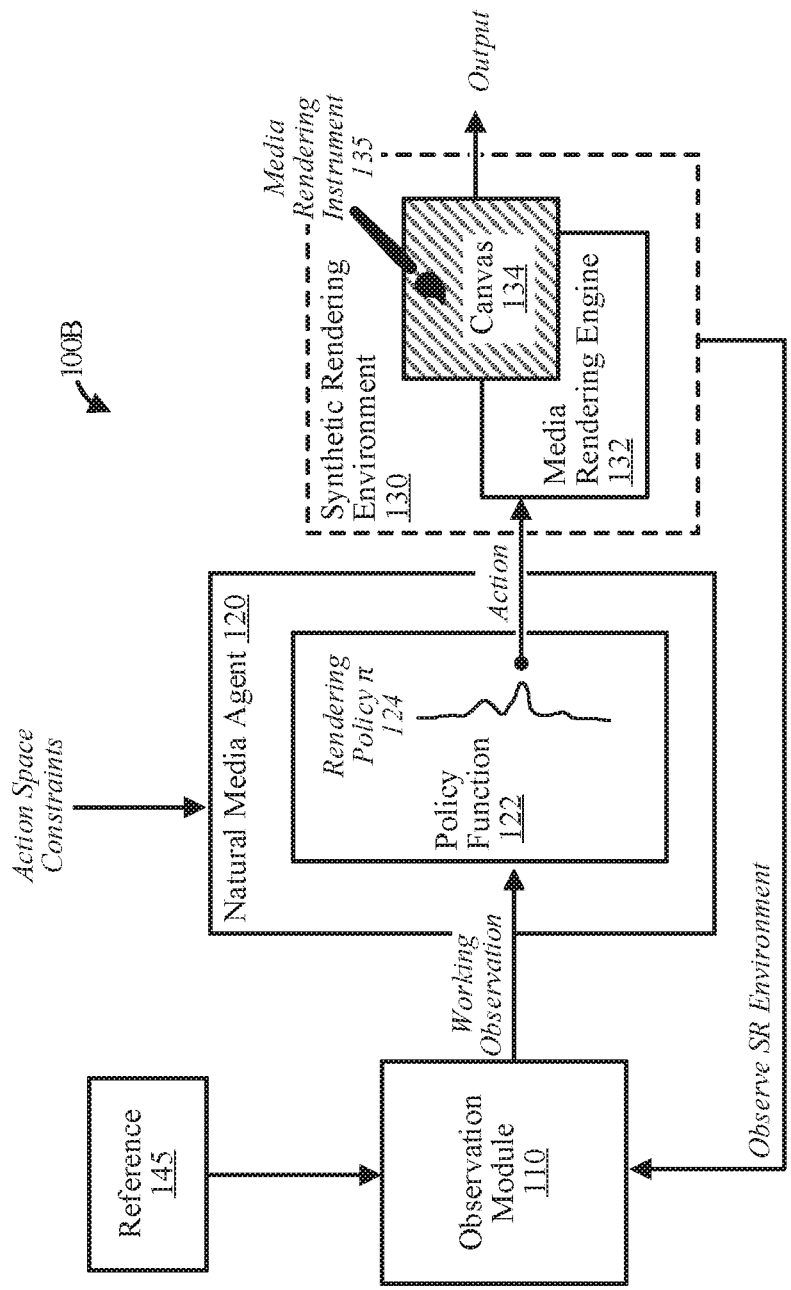
FIG. 1B depicts a block diagram illustrating an example RL-system for applying a trained natural media agent to a reference image, according to some implementations.

FIG. 1B depicts a block diagram illustrating an example RL-system 100B for applying a trained natural media agent 120 to a reference image 145 for step-by-step (or stepwise) selection a series (or sequence) of primitive graphic actions, e.g., sequence of painting strokes in the painting domain, that, when rendered on the canvas 134 in the synthetic rendering environment 130, produce a stylized non-photorealistic version (or reproduction) of the reference image 145 subject to limitations of the action space and the (learned) rendering policy π 124.

Indeed, the natural media agent 120 is trained to select a series (or sequence) of primitive graphic actions that, when rendered on the canvas 134 by the synthetic rendering environment 130, reproduce the reference 145 action-by-action in the implicit style learned based on the training dataset 105 of FIG. 1A. As discussed herein, the reference 145 can be an image or some other indication such as, for example, a caption or text that describes an image. In such instances, the reward generation module 150 is configured to map (or transform) the caption or text that describes the image to a goal configuration, e.g., target image or non-photorealistic artistic work, so that the goal configuration can be compared to the canvas during iterations of the reinforcement-based learning process.

The example RL-system 100B of FIG. 1B includes many of the components of the example RL-system 100A of FIG. 1A, but the training dataset 105 and the reward generation module 150 of FIG. 1A are not used when a trained natural media agent 120 is applied to a reference. Indeed, in the example of FIG. 1B, the trained natural media agent 120 is applied to the reference 145 to produce an output, e.g., a stylized non-photorealistic version (or reproduction) of the reference 145 on the canvas 134.

Figure 2:
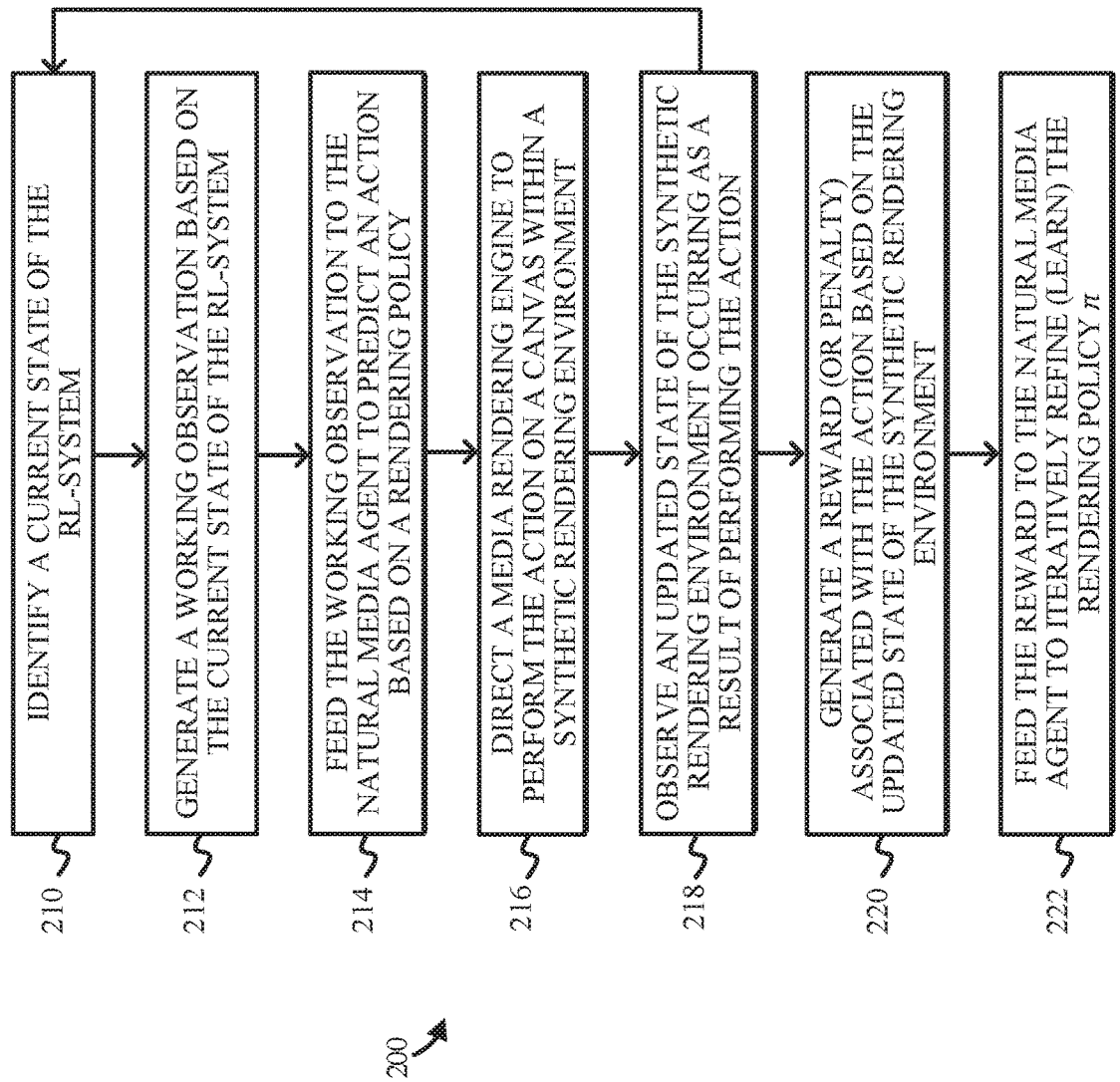
FIG. 2 depicts a flow diagram illustrating an example reinforcement learning process for iteratively applying a current rendering policy to a training reference of a set of training references to sample primitive graphic actions and determine rewards associated with those primitive graphic actions, according to some implementations.

FIG. 2 depicts a flow diagram illustrating an example reinforcement learning process 200 for iteratively applying a current rendering policy to a training reference of a set of training references to sample primitive graphic actions and determine rewards associated with those primitive graphic actions, according to some implementations. The example reinforcement learning process 200 may be performed in various implementations by a RL-system such as, for example, RL-system 100A of FIG. 1A, or one or more processors, modules, engines, or components associated therewith.

To begin, at 210, the RL-system identifies a current state of the RL-system. At 212, the RL-system generates a working observation based on the current state of the RL-system. At 214, the RL-system feeds the working observation to the natural media agent to predict a primitive graphic action based on a rendering policy. At 216, the RL-system directs a media rendering engine to perform the primitive graphic action on a canvas within a synthetic rendering environment. At 218, the RL-system observes an updated state of the synthetic rendering environment occurring as a result of performing the action.

At 220, the RL-system generates a reward (or penalty) associated with the action based on the updated state of the synthetic rendering environment. At 222, the RL-system feeds the reward to the natural media agent to iteratively refine (learn) the rendering policy π.

Figure 3:
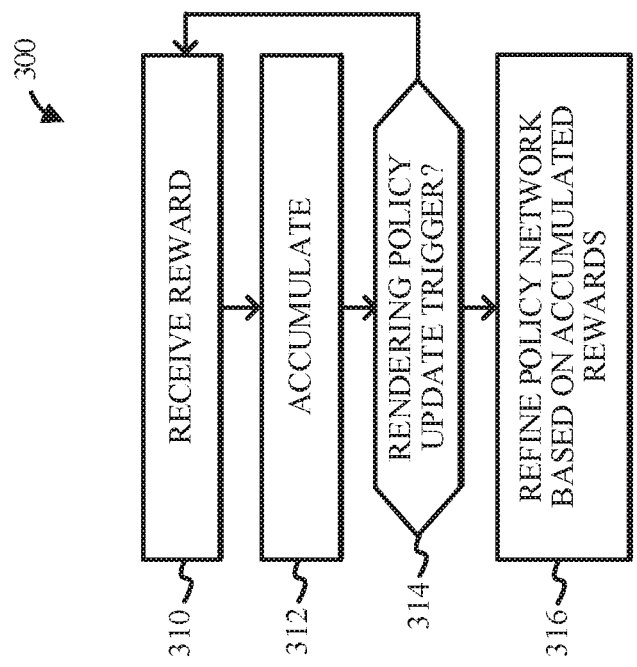
FIG. 3 depicts a flow diagram illustrating an example reinforcement learning process for training a natural media agent to implicitly learn (refine) a rendering policy by iteratively transforming a policy network representative of the rendering policy based on accumulated rewards associated with corresponding primitive graphic actions, according to some implementations.

FIG. 3 depicts a flow diagram illustrating an example reinforcement learning process 300 for training a natural media agent to implicitly learn (refine) a rendering policy by iteratively transforming a policy network representative of the rendering policy based on accumulated rewards associated with corresponding primitive graphic actions, according to some implementations. The example learning process 300 may be performed in various implementations by a reinforcement learning-based system such as, for example, reinforcement learning-based system 100A of FIG. 1A, or one or more processors, modules, engines, or components associated therewith.

To begin, at 310, the RL-system receives a reward. At 312, the RL-system accumulates the reward. At decision 314, the RL-system determines if a rendering policy update trigger has occurred. If so, at 314, the RL-system refines the policy network based on the accumulated rewards. Otherwise, the process continues iteratively at 310.

Figure 4A:
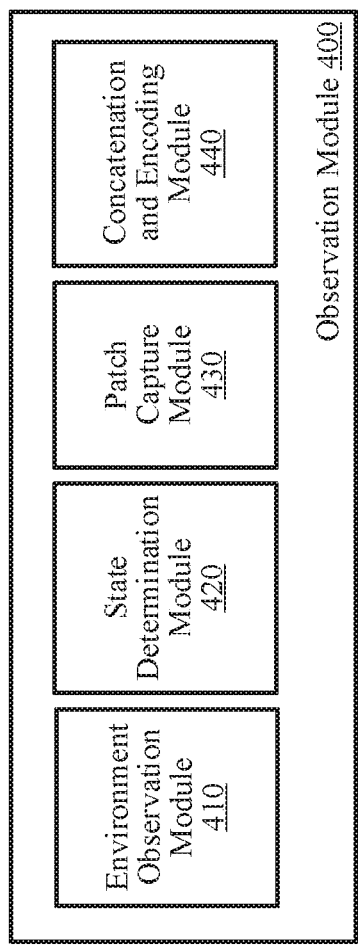
FIG. 4A depicts example components of an observation module, according to some implementations.

FIG. 4A depicts example components of an observation module 400, according to some implementations. The observation module 400 can be observation module 110 of FIG. 1, although alternative configurations are possible. The functions represented by the components, modules, managers and/or engines described with reference to FIG. 4A can be implemented individually or in any combination thereof, partially or wholly, in hardware, software, or a combination of hardware and software. Additionally, although illustrated as discrete components, the operation and functionality of the components, modules, managers and/or engines described with reference to FIG. 4A can be, partially or wholly, integrated within other components of the RL-system 100A.

As illustrated in the example of FIG. 4A, the observation module 400 includes an environment observation module 410, a state determination module 420, a patch capture module 430, and a concatenation and encoding module 440. Other components or modules are also possible. The modules are discussed in greater detail below.

The environment observation module 410 is configured to observe, at each iteration of the RL-system, a current state of the synthetic rendering environment including a current visual state of the canvas and a current position of a media rendering instrument within the synthetic rendering environment. For example, the environment observation module 410 can observe the canvas and determine the current position of the media rendering instrument by viewing the canvas and media rendering instrument or receiving information regarding the current location of the media rendering instrument from the synthetic rendering environment. In some implementations, the environment observation module 410 can be embodied in digital image editing software that is configured to determine the current visual state of a digital canvas. Alternatively, the environment observation module 410 can include visual capture capabilities, e.g., a camera, for capturing a current visual state of a non-digital canvas.

In some implementations, the current visual state of the canvas (digital or non-digital) can be recorded (or captured) as a group or collection of pixels or picture elements. In such instances, each pixel or picture element can be indicative of a physical point in a raster image, or the smallest addressable element in an all points addressable display device, e.g., the smallest controllable element of an image or picture. Likewise, the current location of the media rendering instrument can be indicated using a set of numerical coordinates that specify a unique pixel (or set of pixels) within the group or collection of pixels.

The state determination module 420 is configured to determine or otherwise identify the current state of the RL-system. For example, the state determination module 420 can associate a current state of the synthetic rendering environment with a current training reference of a set of training references. An example illustrating the association of a reference image 452 and a canvas 462 is shown and discussed in greater detail with reference to FIG. 4B. As discussed herein, the RL-system is configured to train the natural media agent to implicitly learn a rendering policy using the set of training references. Accordingly, during each episode, the RL-system uses (or applies) a current training reference of the set of training references. As noted above, this process includes associating the current state of the synthetic rendering environment with the current training reference.

The patch capture module 430 is configured to capture patches (or portions) of the current visual state of the canvas and the current training reference. Indeed, the observation module can capture egocentric patches (or portions) of the current visual state of the canvas and the current training reference based on the current position of the media rendering instrument within the synthetic rendering environment. In some implementations, the egocentric patches (or portions) of the current visual state of the canvas and the current training reference can be centered about the current position of the media rendering instrument. The sizes of the egocentric patches (or portions) of the current visual state of the canvas and the current training reference are typically the same for simplified comparison, e.g., via the compare module 530 of FIG. 5.

In some implementations, the egocentric patches (or portions) of the current visual state of the canvas and the current training reference can be captured at each iteration to ensure that the patches are centered about the current position of the media rendering instrument. Alternatively, the egocentric patches (or portions) of the current visual state of the canvas and the current training reference can be captured after a set number of actions are performed or when the current position of the media rendering instrument is no longer located within a predetermined threshold distance from a center of the patches. The size of the patches can be any subset of the canvas and the current training reference, respectively. The size of the patches be predetermined or dynamically determined based on one or more factors, e.g., predicted actions, etc. As discussed herein, using the egocentric patches ensures that the natural media agent attends to a particular area of the canvas (the patch) in the region of the current position of the media rendering instrument which provides a level of efficiency in the media generation process. That is, using the egocentric patches ensures that the natural media agent generates actions proximate to previous actions resulting in overall efficiency.

The concatenation and encoding module 440 is configured to concatenate the corresponding patches of the current visual state of the canvas and the current training reference. In some implementations, the concatenation and encoding module 440 also encodes the concatenated patches with positional information of the media rendering instrument, e.g., current position within the synthetic rendering environment. In some implementations, it is important to incorporate the positional information of the media rendering instrument into the working observation because the reinforcement learning techniques discussed herein do not include memory mechanics like a replay buffer of deep Q-learning. That is, the current position information can be determined and fed to the natural media agent at each iteration. Furthermore, encoding the concatenated patches with positional information of the media rendering instrument can reduce the action space by limiting the number of potential actions that the natural media agent can select at any given iteration, e.g., due at least to the reduced size of the patch compared to the entire canvas. Thus, the egocentric observations render the challenging problem of training the natural media agent in the continuous action space and large state space as a tractable problem.

In some implementations, the working observation of the current state of the RL-system $O(S_i)$ is defined as:

$$o(s_i) = \left\{ I_i \left[ p_0 - \frac{h_o}{2} : p_0 + \frac{h_o}{2}, p_1 - \frac{w_o}{2} : p_1 + \frac{w_o}{2} \right], \right.$$

-continued
$$\left. I_{ref} \left[ p_0 - \frac{h_o}{2} : p_0 + \frac{h_o}{2}, p_1 - \frac{w_o}{2} : p_1 + \frac{w_o}{2} \right] \right\}.$$

Figure 4B:
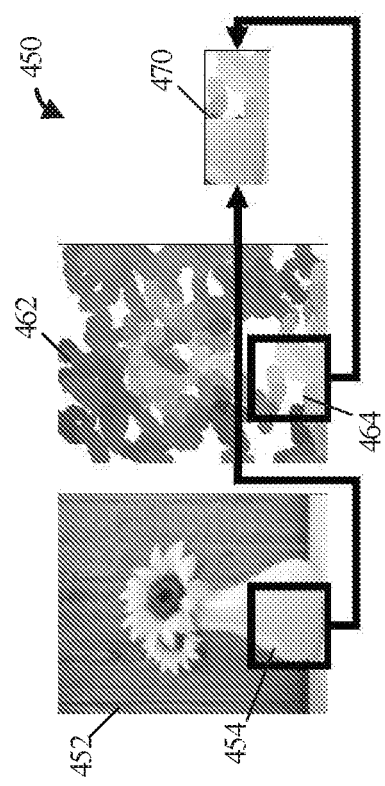
FIG. 4B depicts an example whereby two egocentric patches of the reference image and the canvas, respectively, can be captured from a current state of the system and concatenated to be included as part of a current working observation, according to some implementations.

FIG. 4B depicts an example 450 whereby two egocentric patches 454 and 464 of the reference image 452 and the canvas 462, respectively, are captured from a current state of the system and concatenated to be included as part of a current working observation 470, according to some implementations.

Figure 5:
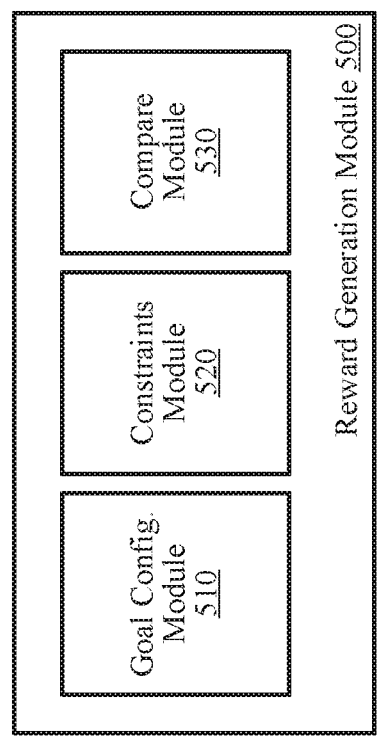
FIG. 5 depicts example components of a reward generation module, according to some implementations.

FIG. 5 depicts example components of a reward generation module 500, according to some implementations. The functions represented by the components, modules, managers and/or engines described with reference to FIG. 5 can be implemented individually or in any combination thereof, partially or wholly, in hardware, software, or a combination of hardware and software. Additionally, although illustrated as discrete components, the operation and functionality of the components, modules, managers and/or engines described with reference to FIG. 5 can be, partially or wholly, integrated within other components of the RL-system 100A.

As illustrated in the example of FIG. 5, the reward generation module 500 includes a goal configuration module 510, a constraints module 520, and a compare module 530. Other components or modules are also possible.

As discussed herein, the reward generation module 500 generates a reward r based on an observation of the current visual state of the canvas. Indeed, the reward generation module 500 is configured to compute a reward $r_i$ corresponding to one or more primitive graphic actions performed on a canvas during the current step (or iteration) i. In some implementations, the reward is defined as a change in the difference between the canvas state after the action and the reference and the canvas state before the action and the reference: Difference (canvas before action, reference)− Difference (canvas after, reference). In some implementations, the reward is defined, at least in part, by a difference between the current visual state (or representation) of the canvas and the current training reference. In some implementations, the reward r is the evaluation of current primitive graphic action $a_i$ computed as the similarity between a target system state S* and the current system state S.

The goal configuration module 510 is configured to set or sample a current training reference of a set of training references (or training dataset) at the start of each episode. As discussed herein, during each episode, the RL-system iteratively tries to reproduce the current training reference action-by-action in a style represented by the current rendering policy π. At each episode, the goal configuration module 510 receives the current training reference and sets the current training reference as the goal configuration.

The constraints module 520 is configured to receive and apply constraints to the generation of rewards. For example, the constraints module 520 can include one or more energy constraints that cause the reward generation module to generate higher rewards for low energy actions or cap or reduce cumulative energy expenditure. In the painting domain, for example, these constraints encourage the media rendering agent to select primitive graphic actions for producing natural (or human-like) strokes (or movements), e.g., primitive graphic actions resulting in longer brush strokes, larger brushes, etc. Other reward constraints are also possible.

The compare module 530 is configured to apply a loss function to compute a reward based on the current goal configuration and the visual state of the canvas occurring as a result of performing the predicted one or more primitive graphic actions during the current iteration. As discussed herein, the rewards train the rendering policy. Indeed, the rewards stimulate the natural media agent to predict actions that reduce the distance between the goal configuration and the visual state of the canvas. For example, a large reward can be provided when the predicted action or actions transform the canvas in a manner that bring the visual state of the canvas into closer proximity (or similarity) with or to the goal configuration. Similarly, a smaller reward (or even a negative valued reward) can be provided when the predicted action or actions transform the canvas in a manner that does not bring the visual state of the canvas into closer proximity (or similarity) with or to the goal configuration. As discussed in more detail below, policy gradient-based reinforcement learning algorithms can be utilized to determine parameters of the rendering policy. Indeed, the parameters of the rendering policy control the policy itself and, thus, are determinative of the predicted actions.

In some implementations, the reward is defined as a change in the difference between the canvas state after the action and the reference and the canvas state before the action and the reference: Difference (canvas before action, reference)−Difference (canvas after, reference). Alternatively or additionally, the loss function captures content and/or other abstract information corresponding to the goal configuration.

In some implementations, different loss functions can be applied based on a state of the RL-system, constraint information, dynamic selection, etc., to obtain to best visual effects of the final renderings. For example, the loss function can be defined as one of $L_2$ loss, $L_{1/2}$ loss, or perceptual loss. The loss function to be used by the compare module 530 can be pre-defined by a user or via configuration controls, dynamically determined, etc.

As discussed herein, the original $L_2$ loss can be formulated as:

$$L_2(I, I^{ref}) = \frac{\sum_{i=1}^{h}\sum_{j=1}^{w}\sum_{k=1}^{c}\|I_{ijk} - I_{ijk}^{ref}\|_2^2}{hwc}$$

where the image I and the reference image $I_{ref}$ is a matrix with a shape h×w×c. In this case, w and h are width and height of the image, and c is the number of color channels. To encourage the natural media agent to match the color and shape of the reference image exactly rather than finding an average color, the RL-system can modify the $L_2$ loss into $L_{1/2}$ loss as follows:

$$L_{\frac{1}{2}}(I, I^{ref}) = \frac{\sum_{i=1}^{h}\sum_{j=1}^{w}\sum_{k=1}^{c}\|I_{ijk} - I_{ijk}^{ref}\|_2^{\frac{1}{2}}}{hwc}.$$

In general, natural media agents trained with $L_{1/2}$ loss tend to respect the shape boundaries better, while natural media agents trained with $L_2$ loss tend to more closely match the average color.

In some implementations, the RL-system can also use a perceptual loss-based reward to encourage the agent to have similar feature representations similar to those computed by a loss network ϕ. In this case, the loss network ϕ is a convolutional neural network for classification purposes. The loss network ϕ can be implemented by comparing the Euclidean distance of the rendered image and the reference image between the feature representations:

$$L_{percept}(I, I^{ref}) = \sum_{n=1}^{N} \frac{\|\phi_n(I) - \phi_n(I^{ref})\|_2^2}{h_n w_n c_n},$$

where the shape of the feature map of $\phi_n$ is $h_n \times w_n \times c_n$. After the loss between I and $I_{ref}$ is defined, $r_i$ is normalized using the following equation such that $r_i \in (-\infty, 1]$.

$$r_i = \frac{L(I_{i-1}, I_{ref}) - L(I_i, I_{ref})}{L(I_0, I_{ref})},$$

where L is a loss function defined as one of $L_2$ loss, $L_{1/2}$ loss, or perceptual loss.

Figure 6:
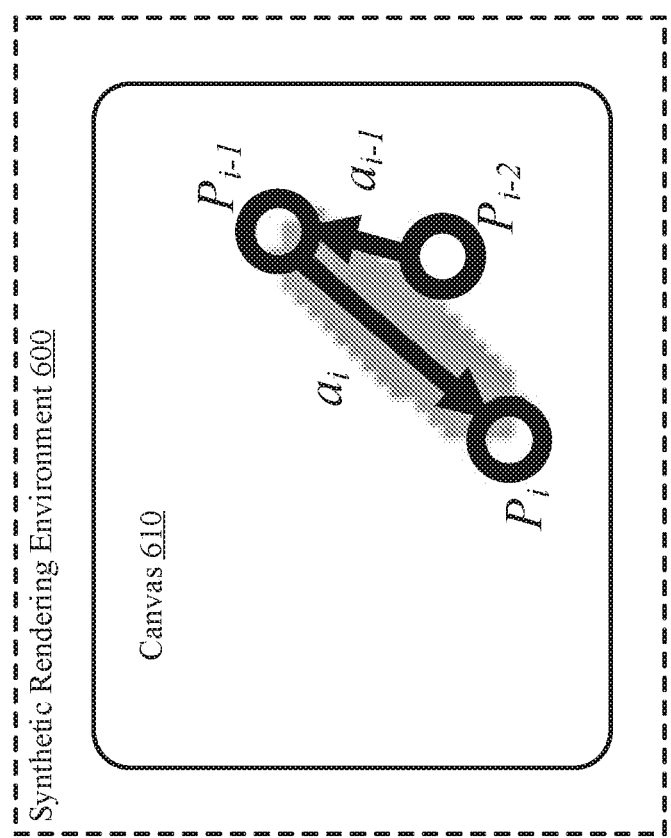
FIG. 6 depicts an example illustrating action-by-action rendering of primitive graphic actions on a canvas within a synthetic rendering environment, according to some implementations.

FIG. 6 depicts an example illustrating action-by-action rendering of primitive graphic actions on a canvas 610 within a synthetic rendering environment 600, according to some implementations. The primitive graphic actions can be implemented or rendered on a canvas by a media rendering engine such as, for example, media rendering engine 132 of FIGS. 1A and 1B or one or more processors, modules, engines, or components associated therewith.

As discussed herein, each action can be denoted as a multi-dimensional vector. For example, in the painting domain, to highlight the painting behavior, the RL-system can denote the primitive graphic actions using properties of a stroke, including position, size, and color. Indeed, a primitive graphic action can be defined as a 6-dimensional vector, $a_i = a, l, w, c_r, c_g, c_b \in \mathbb{R}^6$. In this implementation, each value is normalized to [0, 1]. Moreover, as discussed herein, the primitive graphic action can be defined in a continuous action space. This enables the ability to train the natural media agent using policy gradient-based reinforcement learning algorithms. For example, when w=0, the media rendering instrument, e.g., brush, does not paint on the canvas but moves to an updated position within the synthetic rendering environment.

As discussed above, FIG. 6 illustrates an example action representation associated with multiple primitive graphic actions and the computation between the actions and position. More specifically, primitive graphic actions $a_i$ and $a_{i-1}$ can be defined as $a_i = \{\alpha_i, l_i, c_i\}$ and $a_{i-1} = \{\alpha_i, l_{i-1}, c_{i-1}\}$. Thus, given $p_{i-1}$, the position of the i−1th step, and the action of ith step $a_i$, $p_{i-1} = p_{i-1} + [l_{i-1} \sin(\alpha_i), l_{i-1} \cos(l_i)]$.

Figure 7:
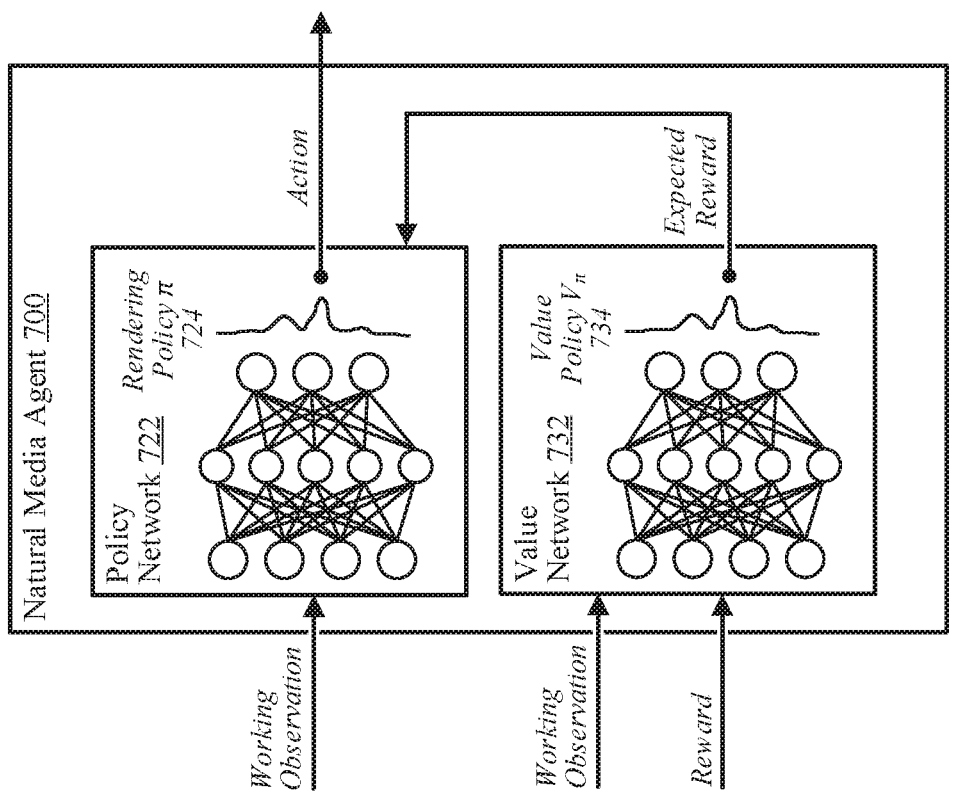
FIG. 7 depicts an example natural media agent whereby the policy function and the rendering policy can be embodied by policy network and rendering policy, respectively, according to some implementations.

FIG. 7 depicts an example natural media agent 700 whereby the policy function and the rendering policy can be embodied by policy network 722 and rendering policy 724, respectively, according to some implementations. As discussed herein, the policy network 722 can be trained to learn the rendering policy 724 from a set of training references and can be implemented using a deep neural network. The policy function and the rendering policy can be policy function 122 and rendering policy 124 of FIG. 1A, although alternative configurations are possible.

Reinforcement learning typically consists of an agent which interacts with the environment via its actions at discrete time steps, receives a reward and subsequently transitions to a new state. The agent formally works through a theoretical framework known as a Markov Decision Process (MDP) which consists of a decision, e.g., what action to take or perform on the environment, to be made at each state. This sequence of states, e.g., actions and rewards, are referred to as a trajectory. As discussed herein, reinforcement learning-based techniques are utilized for training a natural media agent, e.g., natural media agent 700, to implicitly learn a policy for rendering stylized non-photorealistic artistic works, e.g., paintings, drawings, etc., without human supervision or labeled datasets.

As shown in the example of FIG. 7, the natural media agent 700 includes a value function $V_\pi$, implemented by a value network 732. The value network 732 can predict expected rewards given a particular state following the rendering policy. More specifically, the value network 732 is designed to approximate a value policy $V_\pi$, 734. Like the policy network 722, the value network 732 is implemented using a deep neural network. Other possible learning frameworks are possible. Additional or fewer systems or components are also possible.

In some implementations, the structure of the policy network 722 can be described as follows with the input comprising a concatenated patch of the reference image (or training reference) and canvas 41×82×3 given a sample size of 41×41×3. The first hidden layer convolves 64 8×8 filters with stride 4. The second hidden layer convolves 64 4×4 filters with stride 2. The third layer convolves 64 3×3 filters with stride 1. Next, the output of the third layer connects to a fully-connected layer with 512 neurons. In this example, each of the layers uses a ReLU activation function.

As discussed herein, several techniques like curriculum learning and difficulty-based sampling can be utilized to reduce the search space of the policy network 722 and improve convergence performance. The search (or exploration) space refers to the process of exploring which actions result in the highest rewards. Indeed, to accelerate training convergence and improve performance of the RL-system, curriculum learning, and difficulty-based sampling can be utilized.

In some implementations, due to the continuous action space, e.g., $a \in \mathbb{R}^{no.\ of\ dimensions}$, the search (or exploration) space can be extremely large as the number of time steps increases. The search (or exploration) space refers to the process of exploring which actions result in the highest rewards. The search (or exploration) space can also be referred to as the sampling space. Furthermore, the reward, e.g., received scalar signal, can be overwhelmed by noise while applying policy gradient based reinforcement learning algorithms. Accordingly, curriculum leaning can be utilized to train the natural media agent 700 efficiently. Indeed, sampled trajectories increase with the training episodes. As a result, the natural media agent 700 can iteratively learn and generate relatively long primitive graphic actions, e.g., strokes, compared to a baseline technique without curriculum learning. As discussed herein, the natural media agent tends to find the reward greedily in the limited time steps.

Another challenge is the bias between different samples. In some implementations, a difficulty-based sampling technique can be utilized to overcome the bias between different samples. For common reinforcement learning tasks, the goal is usually fixed. In the case of the RL-system discussed herein, however, the training references can be different to prevent over-fitting. Specifically, the RL-system can incorporate a difficulty-based sampling approach to sample more (allow more iterations) from the images that are predicted to have worse performance.

With reinforcement learning, the optimal policy $\pi^*$ maximizes the expected long-term reward $J(\pi)$, which can be accumulated by discounted rewards $r_i$ in a parameter $t_{max}$ of steps with a factor $\gamma \in R$, $$J(\pi) = \sum_{i=1}^{t_{max}} r_i \gamma^i,$$

where $t_{max} \in Z$ is fixed as the maximal number of steps for each trial.

In the painting medium, for example, there can be many goal configurations which are distributed sparsely in a high dimensional space. This can cause the converging process to fail because the natural media agent can hardly compute the gradient of the policy. Accordingly, in some implementations, the parameter $t_{max}$ can be modified by introducing a reward threshold $r_{thresh}$, and increasing gradually during the training process as:

$$\hat{t}_{max} = \arg\min_i (r_i > r_{thresh}).$$

Using the modified $t_{max}$ parameter, the policy gradient algorithm can converge efficiently with a set of complex goal configurations. As discussed herein, the policy is encouraged to find rewards greedily in limited time steps to reduce the possible exploration space.

As illustrated in Algorithm 1 (which appears below), the RL-system can incorporate a difficulty-based sampling method to select a goal configuration for each trial (or episode) from a set of reference images. This sampling method can overcome the bias between different samples. For common reinforcement learning tasks, the goal is usually fixed. However, with the RL-system, the reference image can change to prevent over-fitting. Specifically, for each run of the agents, the environment can be initialized by po and $I_{ref}^{(t)}$, wherein $I_{ref}^{(t)}$ can be selected from the training dataset $\{I_{ref}^{(t)}\}$ with size n.

For different $I_{ref}^{(t)}$, the maximum reward collected each run can vary throughout the training process when $t \in Z$ can be randomly sampled in [0, n]. Thus, learning progress tends to be unbalanced among the dataset, which can cause policy over-fitting for specific inputs. The difficulty-based sampling method can be designed to mitigate the learning progress among the set of goal configurations. Specifically, the approach encourages the RL-system to sample more from the images with the worst performances.

---

Algorithm 1 Difficulty-based Sampling

Require: Reference images $\{I_{ref}^{(i)}\}$ with sampling amount n, total iterations N
Ensure: Painting Policy $\pi$ and its value function $V_\pi$
1:  $\{r^{(i)}\}$ // Mean reward tested using the sample
2:  for i = 1, . . . , $t_{max}$ do
3:    $r_i = 0$ //Initialization
4:  end for
5:  for inter = 1, . . . , N do
6:    for i = 1, . . . , n do
7:      $r_i = V_\pi(o(I_{ref}^{(i)}))$ // initialize the reward with the policy
8:      if $r_i < r_{min}$ then
9:        $r_{min} = r_i$
10:       $min_i = i$
11:     end if
12:   end for
13:   $\pi$ = UPDATE($\pi$, $o(I_{ref}^{(min_i)})$)
14: end for
15: return $\pi$

---

Figure 8:
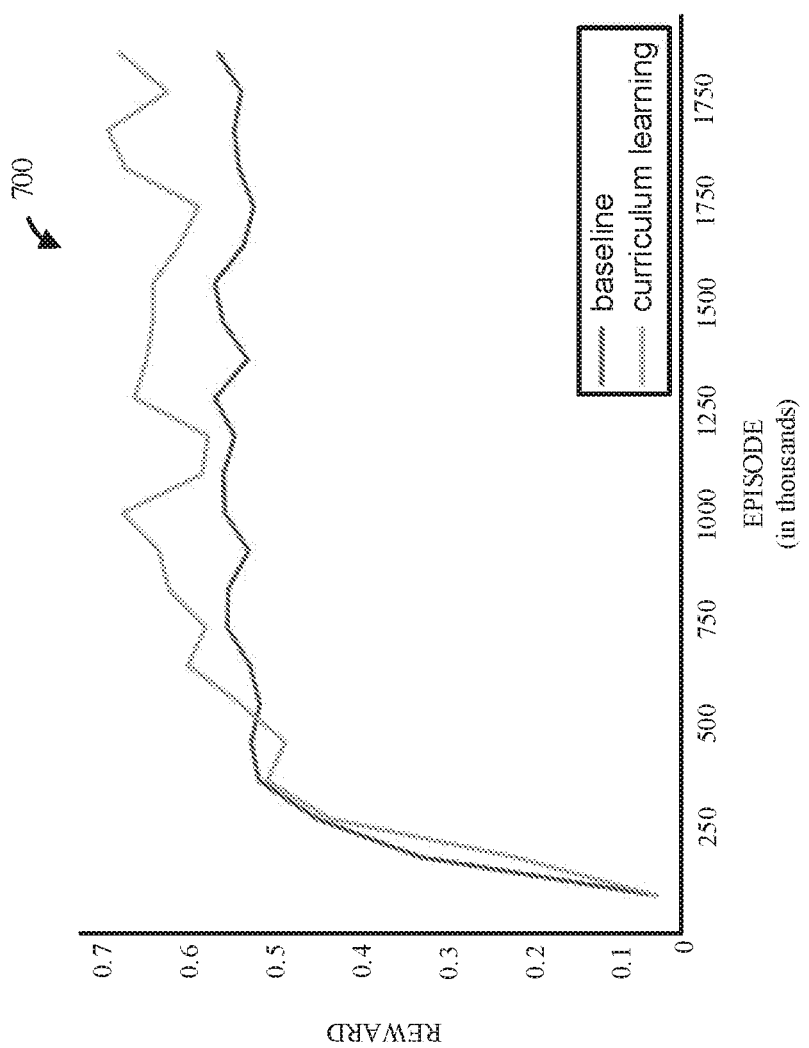
FIG. 8 depicts a graphical diagram illustrating a comparison of multiple techniques (or models) for achieving convergence (or a learning curve), according to some implementations.

FIG. 8 depicts a graphical diagram 800 illustrating a comparison of multiple techniques (or models) for achieving convergence (or a learning curve), according to some implementations. More specifically, the example of FIG. 8 illustrates comparison of convergence using a baseline model vs. a curriculum learning model for reinforcement learning-based training as discussed herein.

Figure 9:
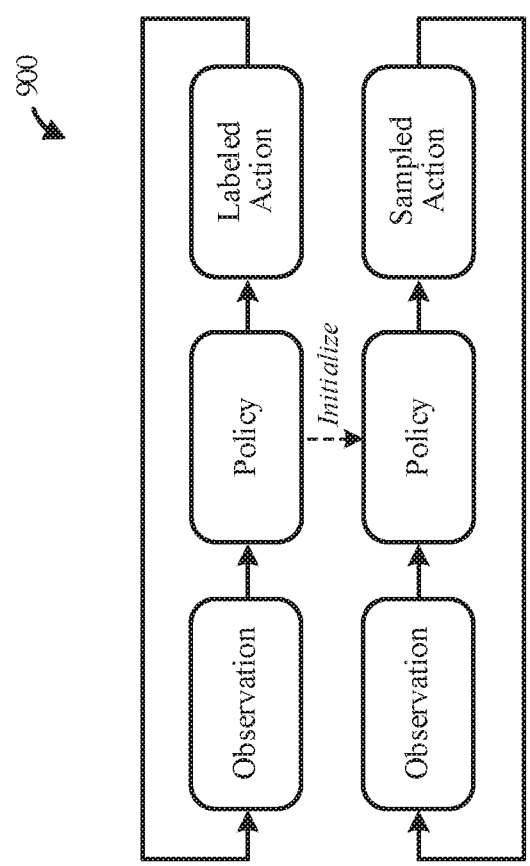
FIG. 9 depicts an example illustrating a RL-system utilizing a supervised learning-based framework to pre-train a policy function embodied as a policy network, according to some implementations.

FIG. 9 depicts an example illustrating a RL-system utilizing a supervised learning-based framework to pre-train a policy function embodied as a policy network, according to some implementations. More specifically, the RL-system shown in the example of FIG. 9 utilizes an imitation learning-based framework to pre-train the policy network (or function).

As discussed herein, a natural media agent can be trained using reinforcement learning to implicitly learn a rendering policy in a multi-dimensional continuous action space. However, the learned behavior of the agent tends to be rigid and greedy compared with human behavior. For example, the trained natural media agent is more likely to generate actions in a single zigzag trajectory rather in multiple separate straight segments because these trajectories generally require fewer steps (or iterations) and allow the natural media agent to collect more reward at each step.

Accordingly, in some implementations, the rendering policy can be initialized by pre-training the natural media agent using behaviors of human artists and recording the corresponding trajectories. The pretraining process can also help reduce the search (or exploration) space. Specifically, the RL-system can be initialized with a given observation and labeled actions taken by a human expert, which can be converted into trajectories by the RL system. The recorded data can include many configurations. For example, in the painting domain, the recorded data can include configurations of strokes, including tilting, pressure, and rotation. To transfer this human-like artistic behavior or knowledge, the configuration is extracted and converted into the action space of natural media agent.

Figure 10A:
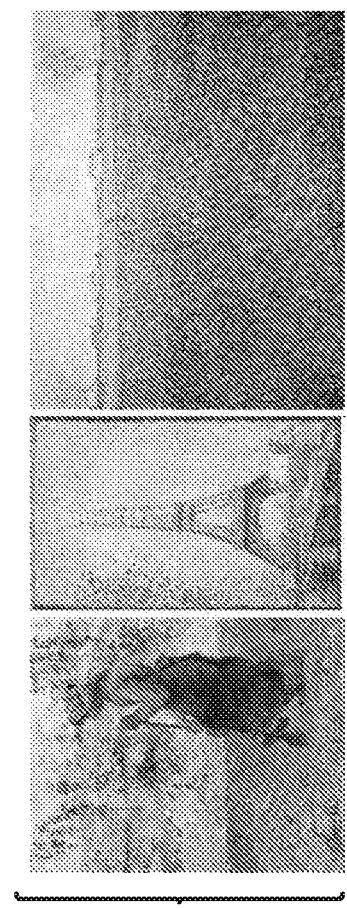
FIGS. 10A and 10B depict a set of training references for training a natural media agent and, once trained, applying the trained natural media agent, according to some implementations.
Figure 10B:
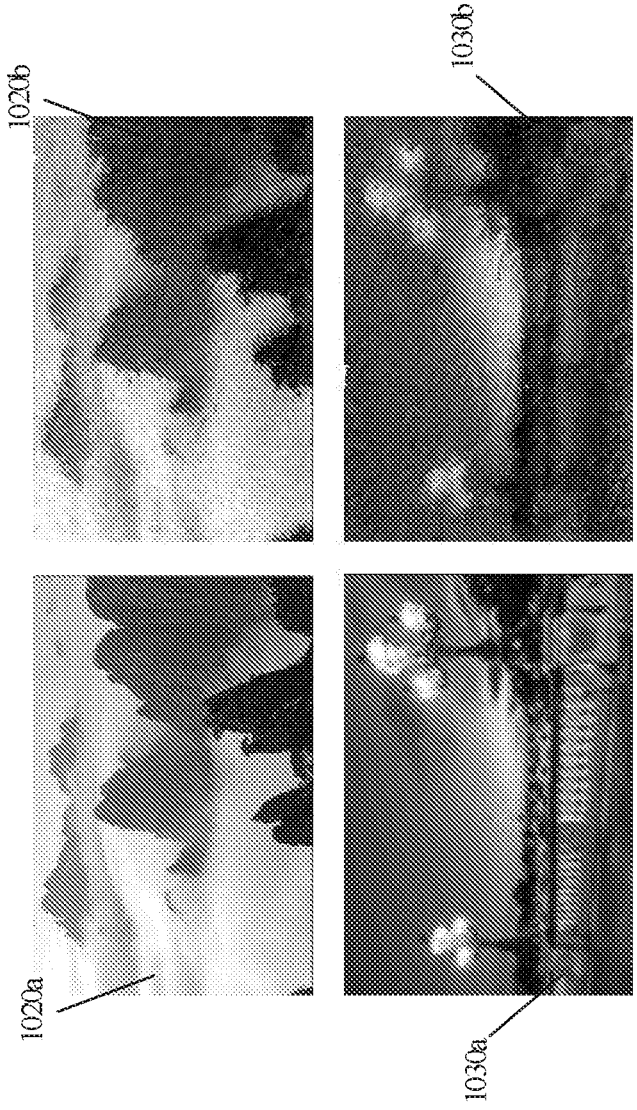

FIGS. 10A and 10B depict a set of training references for training a natural media agent and, once trained, applying the trained natural media agent, according to some implementations. More specifically, FIG. 10A depicts a set of training references 1010 for training a natural media agent to implicitly learn a rendering policy $\pi$ in a multi-dimensional continuous action space. As discussed herein, the natural media agent implicitly learns styles and/or technique based on the set of training references.

FIG. 10B depicts example results or outputs achieved as a result of applying the trained natural media agent of FIG. 10A. Specifically, as shown in the example of Figure the trained natural media agent uses the rendering policy $\pi$ learned using the set of training references 1010 to produce stylized non-photorealistic versions (or reproductions) 1020b and 1030b of the reference images 1020a and 1030a, respectively. As discussed herein, the stylized non-photorealistic versions (or reproductions) 1020b and 1030b can be generated action-by-action subject to limitations of the action space and the (learned) rendering policy $\pi$.

Figure 11:
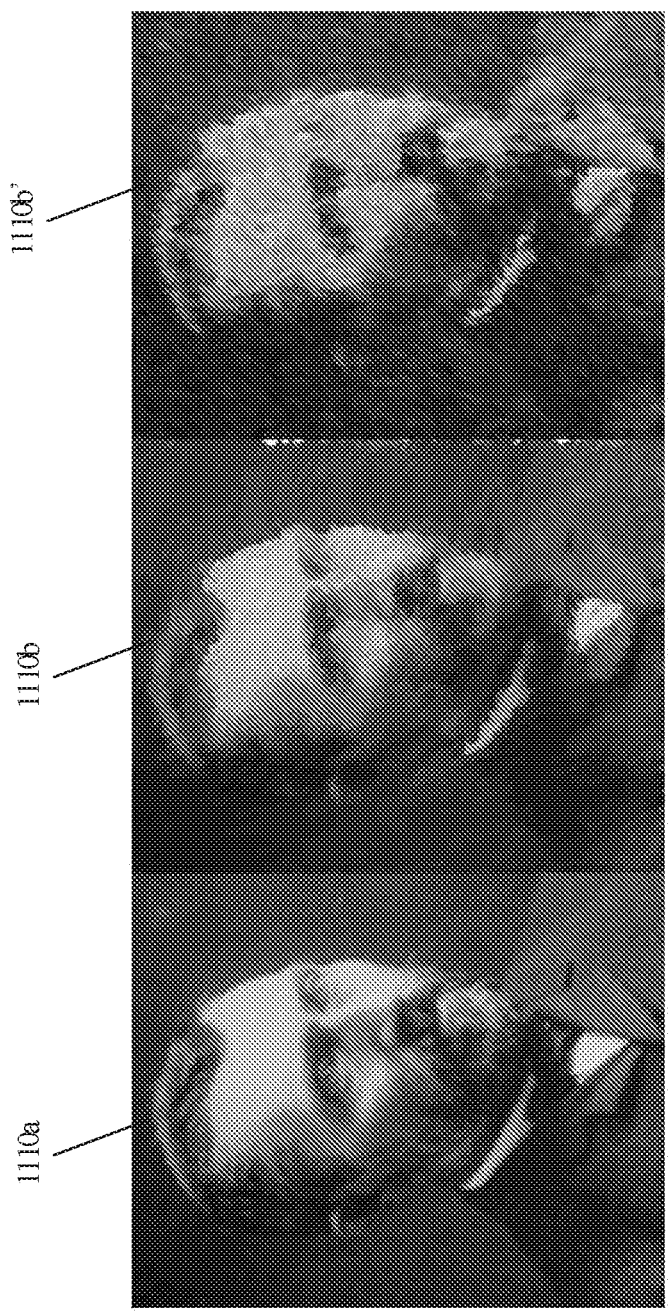
FIG. 11 depicts example results or output achieved by applying a natural media agent with different sets of training references, according to some implementations.

FIG. 11 depicts example results or output achieved by applying a natural media agent with different sets of training references, according to some implementations. More specifically, given an input reference image 110a, the natural media agent produces output 1110b when trained by watercolor paintings and output 1110b' when trained by Van Gogh's oil paintings. Although not shown, the techniques discussed herein can facilitate, among other improvements, various style transferring tools to create effects, e.g., by turning an input reference image into a natural painting output of a desired customizable style.

FIG. 12 illustrates computing system 1201 that is representative of any system or collection of systems in which the various processes, programs, services, and scenarios disclosed herein may be implemented. Examples of computing system 1201 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1201 may be implemented as a single apparatus, system, or device or may be implemented in a distributed manner as multiple apparatuses, systems, or devices. Computing system 1201 includes, but is not limited to, processing system 1202, storage system 1203, software 1205, communication interface system 1207, and user interface system 1209 (optional). Processing system 1202 is operatively coupled with storage system 1203, communication interface system 1207, and user interface system 1209.

Processing system 1202 loads and executes software 1205 from storage system 1203. Software 1205 includes and implements process 1206, which is representative of the processes discussed with respect to the preceding Figures. When executed by processing system 1202 to provide packet rerouting, software 1205 directs processing system 1202 to operate as described herein for at least the various processes, operational scenarios, and sequences discussed in the foregoing implementations. Computing system 1201 may optionally include additional devices, features, or functionality not discussed for purposes of brevity.

Continuing with the example of FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general purpose central processing units, graphical processing units, application specific processors, and logic devices, as well as any other type of processing device, combinations, or variations thereof.

Storage system 1203 may comprise any computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including learning process 1206) may be implemented in program instructions and among other functions may, when executed by processing system 1202, direct processing system 1202 to operate as described with respect to the various operational scenarios, sequences, and processes illustrated herein. For example, software 1205 may include program instructions for implementing a reinforcement learning process to learn an optimum scheduling policy as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system customized to provide motion learning. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. One or more non-transitory computer-readable media storing executable instructions, which when executed by a processing device, cause the processing device to perform operations comprising:
   predicting, by applying a representation of a current working observation of a canvas in a synthetic rendering environment to a natural media agent comprising one or more deep neural networks, at least one primitive graphic action;
   executing, by a media rendering engine, the at least one primitive graphic action to generate an updated state of the canvas in the synthetic rendering environment;
   updating, by a reward generation module, an accumulated reward, accumulated over a plurality of iterations of the natural media agent, based on a difference between at least a portion of the updated state of the canvas and a current training image of a set of training images; and
   updating, in response to detecting a trigger, the one or more deep neural networks using the accumulated reward, wherein the trigger comprises at least one of a designated number of iterations of the natural media agent, a number of iterations of the natural media agent that increases between episodes of iterations during which the accumulated reward is updated, or a determination that a position of a media rendering instrument in the updated state of the canvas moved more than a threshold distance from a center of an ego-centric patch of the canvas.

2. The one or more non-transitory computer-readable media of claim 1, wherein the representation of the current working observation applied to the natural media agent comprises an encoded representation of position of a media rendering instrument on the canvas.

3. The one or more non-transitory computer-readable media of claim 1, wherein the representation of the current working observation applied to the natural media agent comprises a concatenated representation of corresponding ego-centric patches of the canvas and the current training image.

4. The one or more non-transitory computer-readable media of claim 1, wherein the accumulated reward encourages the natural media agent to predict longer strokes.

5. The one or more non-transitory computer-readable media of claim 1, the operations further comprising pre-training the natural media agent on data representing human behaviors prior to training the natural media agent using reinforcement learning.

6. The one or more non-transitory computer-readable media of claim 1, wherein curriculum leaning is used to encourage the natural media agent to find the accumulated reward.

7. The one or more non-transitory computer-readable media of claim 1, wherein the accumulated reward is updated over the plurality of iterations using a difficulty-based method.

8. A method comprising:
generating, based at least on processing a representation of a current working observation of a canvas in a synthetic rendering environment using a natural media agent comprising one or more deep neural networks, a representation of at least one primitive graphic action;
generating an updated state of the canvas in the synthetic rendering environment based at least on the at least one primitive graphic action;
updating an accumulated reward, accumulated over a plurality of iterations of the natural media agent, based on a difference between at least a portion of the updated state of the canvas and a current training image of a set of training images; and
updating, in response to detecting a trigger, the one or more deep neural networks using the accumulated reward, wherein the trigger comprises at least one of a designated number of iterations of the natural media agent, a number of iterations of the natural media agent that increases between episodes of iterations during which the accumulated reward is updated, or a determination that a position of a media rendering instrument in the updated state of the canvas moved more than a threshold distance from a center of an ego-centric patch of the canvas.

9. The method of claim 8, wherein the representation of the current working observation processing using the natural media agent comprises an encoded representation of position of a media rendering instrument on the canvas.

10. The method of claim 8, wherein the representation of the current working observation processing using the natural media agent comprises a concatenated representation of corresponding ego-centric patches of the canvas and the current training image.

11. The method of claim 8, wherein the accumulated reward encourages the natural media agent to generate longer strokes.

12. The method of claim 8, further comprising pre-training the natural media agent on data representing human behaviors prior to training the natural media agent using reinforcement learning.

13. The method of claim 8, wherein curriculum leaning is used to encourage the natural media agent to find the accumulated reward.

14. The method of claim 8, wherein the accumulated reward is updated over the plurality of iterations using a difficulty-based method.

15. A system comprising:
a memory component; and
one or more processing devices coupled to the memory component, the one or more processing devices configured to perform operations comprising:
predicting, by applying a representation of a current working observation of a canvas in a synthetic rendering environment to a natural media agent comprising one or more deep neural networks, at least one primitive graphic action;
executing the at least one primitive graphic action to generate an updated state of the canvas in the synthetic rendering environment;
updating an accumulated reward, accumulated over a plurality of iterations of the natural media agent, based on a difference between at least a portion of the updated state of the canvas and a current training image of a set of training images; and
updating, in response to detecting a trigger, the one or more deep neural networks using the accumulated reward, wherein the trigger comprises at least one of a designated number of iterations of the natural media agent, a number of iterations of the natural media agent that increases between episodes of iterations during which the accumulated reward is updated, or a determination that a position of a media rendering instrument in the updated state of the canvas moved more than a threshold distance from a center of an ego-centric patch of the canvas.

16. The system of claim 15, wherein curriculum leaning is used to encourage the natural media agent to find the accumulated reward.

17. The system of claim 15, wherein the representation of the current working observation of the canvas in the synthetic rendering environment comprises an encoded representation of position of a media rendering instrument on the canvas.

18. The system of claim 15, wherein the representation of the current working observation of the canvas in the synthetic rendering environment comprises a concatenated representation of corresponding ego-centric patches of the canvas and the current training image.

19. The system of claim 15, wherein the accumulated reward encourages the natural media agent to predict longer strokes.

20. The system of claim 15, wherein the operations further comprise pre-training the natural media agent on data representing human behaviors prior to training the natural media agent using reinforcement learning.

* * * * *